(12) United States Patent
Li et al.

(10) Patent No.: US 10,437,141 B2
(45) Date of Patent: Oct. 8, 2019

(54) ANIMATION PROJECTOR

(71) Applicant: Everstar Merchandise Co Ltd, Taipei (TW)

(72) Inventors: Chen Der Li, Taoyuan (TW); Chen Chih Lung, Xinbei (TW); Chen Chih Ming, Xinbei (TW)

(73) Assignee: Everstar Merchandise Co Ltd, Taipei (TW)

( * ) Notice: Subject to any disclaimer, the term of this patent is extended or adjusted under 35 U.S.C. 154(b) by 0 days.

(21) Appl. No.: 16/039,476

(22) Filed: Jul. 19, 2018

(65) Prior Publication Data

US 2019/0025693 A1  Jan. 24, 2019

(30) Foreign Application Priority Data

Jul. 21, 2017 (TW) .............................. 106124667 A

(51) Int. Cl.
  *G03B 23/10* (2006.01)
  *G03B 21/20* (2006.01)
(52) U.S. Cl.
  CPC ........... *G03B 23/10* (2013.01); *G03B 21/206* (2013.01); *G03B 21/2013* (2013.01); *G03B 21/2033* (2013.01)
(58) Field of Classification Search
  CPC .... F21S 8/03; F21S 10/00; G02B 5/18; G02B 27/00; G02B 21/2033; G03B 21/20; G03B 25/00; G03B 23/10; G03B 21/2013; G03B 21/206; G03B 21/54; F21Y 2101/00; G02H 2001/22; G03H 2270/21; G03H 2270/22; G03H 2270/23
  See application file for complete search history.

(56) References Cited

U.S. PATENT DOCUMENTS

| 3,822,930 A | 7/1974 | Douklias |
| 3,944,761 A | 3/1976 | Nicholl et al. |
| 5,369,271 A * | 11/1994 | Nyui ........................ G01D 5/38 |
| | | 250/231.16 |
| 6,190,025 B1 | 2/2001 | Solinsky |

(Continued)

FOREIGN PATENT DOCUMENTS

| CN | 201173996 | 12/2008 |
| CN | 202691883 | 1/2013 |
| WO | WO-2017054823 A1 * | 4/2017 ............. G03B 25/00 |

Primary Examiner — Cara E Rakowski
Assistant Examiner — Danell L Owens
(74) Attorney, Agent, or Firm — Womble Bond Dickinson (US) LLP

(57) ABSTRACT

A laser projection device has at least one laser light source and a plurality of gratings, each grating having a light receiving side and a light emitting side. The plurality of gratings are arranged in a ring-shape having at least one row with the light receiving side of each grating facing a center of the ring. The laser projection device also has a motor configured to rotate the plurality of gratings about a rotational axis passing through the center of the ring. The plurality of gratings each comprise a pattern for forming an image when light is passed through the pattern. The plurality of gratings are arranged around the ring such that the plurality of patterns are configured to project an animated image when the plurality of gratings sequentially receive light from the at least one laser light source upon rotation of the grating set.

15 Claims, 16 Drawing Sheets

(56) References Cited

U.S. PATENT DOCUMENTS

| | | |
|---|---|---|
| 6,802,630 B2 | 10/2004 | Doppelt |
| 7,257,551 B2 | 8/2007 | Oskorep et al. |
| 8,100,537 B2 | 1/2012 | Johnson |
| D765,906 S | 9/2016 | Khubani et al. |
| D766,483 S | 9/2016 | Khubani et al. |
| D766,484 S | 9/2016 | Khubani et al. |
| 9,458,994 B1 | 10/2016 | Khubani et al. |
| D773,707 S | 12/2016 | Lentine |
| 9,546,775 B1 | 1/2017 | Khubani et al. |
| D778,478 S | 2/2017 | Khubani et al. |
| 9,562,673 B1 | 2/2017 | Khubani et al. |
| D794,860 S | 8/2017 | Khubani et al. |
| D797,975 S | 9/2017 | Lentine |
| D798,484 S | 9/2017 | Lentine |
| 9,752,761 B2 | 9/2017 | Lentine |
| 9,869,459 B2 | 1/2018 | Lentine |
| 9,879,847 B2 | 1/2018 | Khubani et al. |
| 10,197,234 B2 | 2/2019 | Lentine et al. |
| 2014/0253893 A1* | 9/2014 | Wu .................... G03F 7/70616 355/67 |
| 2014/0313779 A1* | 10/2014 | Higgins ................ F21S 8/035 362/643 |
| 2016/0238221 A1 | 8/2016 | Lentine |
| 2017/0045208 A1 | 2/2017 | Lentine |
| 2017/0159924 A1* | 6/2017 | Khubani ............... F21V 29/503 |
| 2017/0175963 A1 | 6/2017 | Lentine et al. |
| 2017/0191630 A1 | 7/2017 | Lentine |
| 2017/0191631 A1 | 7/2017 | Lentine et al. |
| 2017/0191644 A1 | 7/2017 | Khubani et al. |
| 2017/0191691 A1 | 7/2017 | McKie et al. |
| 2017/0205034 A1 | 7/2017 | Lau et al. |

\* cited by examiner

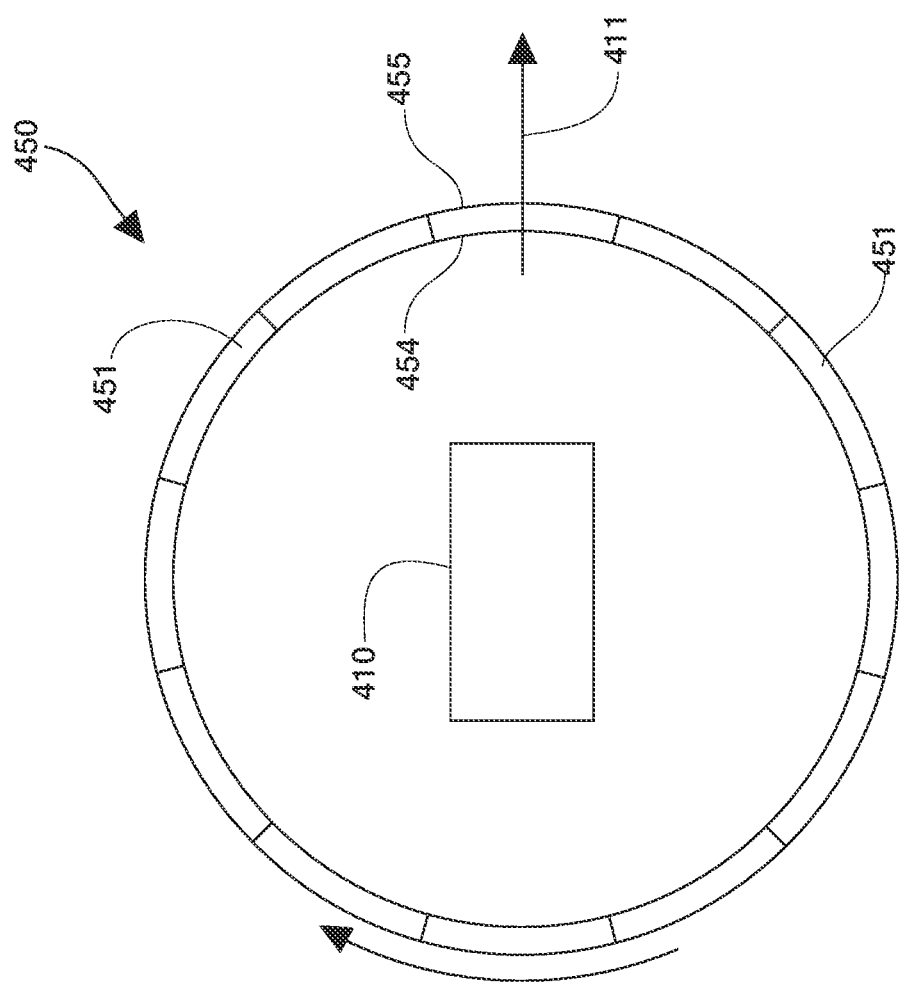

ANIMATION PROJECTOR

RELATED APPLICATIONS

The present disclosure relates to and claims priority to TW106124667 filed Jul. 21, 2017, which is incorporated herein in its entirety.

FIELD OF THE DISCLOSURE

The present disclosure relates to image projectors, such as outdoor decorative image projectors. More particularly, the present disclosure relates to projectors that project an animated image. More particularly, the present disclosure relates to projectors that project an animated image with laser light sources.

BACKGROUND

People often decorate their homes or businesses to create a festival atmosphere to celebrate holidays. Decorations are particularly prevalent near Christmas. A variety of lights or ornaments are available as decorations, such as the well-known strings of Christmas lights, many of which now use light emitting diodes (LEDs). However, it takes a significant amount of time to mount and dismount such strings of lights. Further, occasional poor electrical connections along the string can lead to failure to emit light. Thus, in recent years, traditional LED light strings have been gradually replaced by LED and laser projection devices.

FIG. 1 schematically illustrates the construction of a conventional laser projection device 10. The laser projection device 10 is disposed with light sources 11, 12 to project light beams of different colors to a light transmitting mirror 13. The light beams are projected to a first lens 14. The light passes through the first lens 14 and the second lens 15 to produce a light effect by projection. The laser projection device 10 is configured with a motor 18 that turns the second lens 15 using a turntable 17 and a drive 16 to make the projected light image move and create the visual effect of mobile images.

The architecture of the traditional laser projection device 10 has dominated the market and has remained unchanged for years. Regardless of the visual effect rendered by this architecture, it still has many deficiencies. For example, the image projected by the traditional laser projection device 10 is a single fixed image. Driving the motor 18 moves the projected image on the display surface, but does not change the image itself. Therefore, there is a need for an improved laser projection device for use when decorating for holidays or other occasions.

BRIEF SUMMARY

The present disclosure describes a laser projection device that has at least one laser light source and a plurality of gratings, each grating having a light receiving side and a light emitting side. The plurality of gratings are arranged in a ring-shape having at least one row with the light receiving side of each grating facing a center of the ring. The laser projection device also has a motor configured to rotate the plurality of gratings about a rotational axis passing through the center of the ring. The plurality of gratings each comprise a pattern for forming an image when light is passed through the pattern. The plurality of gratings are arranged around the ring such that the plurality of patterns are configured to project an animated image when the plurality of gratings sequentially receive light from the at least one laser light source upon rotation of the grating set.

According to some embodiments of the laser projection device, at least one periscope is provided to direct the light from the at least one laser light source to the light receiving side of the plurality of gratings.

According to some embodiments of the laser projection device, the least one laser light source is positioned within the ring created by the plurality of gratings.

The present disclosure also describes a laser projection device including at least one laser light source, which is configured to emit light. The laser projection device also includes a plurality of gratings, each grating having a light receiving side and a light emitting side, wherein the plurality of grating are arranged in a ring-shape having at least one row with the light receiving side of each grating facing a center of the ring. The laser projection device also includes a motor configured to rotate the plurality of gratings about a rotational axis passing through the center of the ring. The plurality of gratings each comprise a pattern for forming an image on a display surface when light is passed through the pattern of the grating. The plurality of gratings are arranged around the ring such that the plurality of patterns are configured to project an animated image when the plurality of gratings sequentially receive light from the at least one laser light source upon rotation of the plurality of gratings. The at least one laser light source is disposed within the ring to emit light directly to the light emitting side of each grating.

BRIEF DESCRIPTION OF THE DRAWINGS

FIG. 7C schematically illustrates a top view of the laser projection device of FIG. 7A.

DETAILED DESCRIPTION

The present disclosure describes a laser projection device that may include a laser light source set, a grating set, and a motor. The laser projection device may optionally include a bandpass filter. The laser light source set may be configured to emit a plurality of colors from a plurality of lasers. The grating set may create a ring structure having a plurality of gratings. The gratings may be disposed around the edge of the grating set. In one embodiment, the motor is linked to the grating set and configured to rotate the grating set. The gratings that form the grating set may form a pattern. The gratings are positioned to create a substantially continuous pattern. When light from the laser light source set passes the gratings, an animation effect of the continuous pattern is presented.

Unlike the prior art, which involves moving a singular image on a display surface, the laser projection device of the present disclosure is configured to project an animated image characterized by a changing image as the result of different images (e.g. patterns) projected by each of the gratings in the grating set.

The laser projection device may optionally include a periscope. When present, the periscope receives light and then projects the light to an inner edge of the grating set to direct light through the gratings. The periscope includes an inlet and an outlet. In one embodiment, a motor, such as a stepper motor, is connected with the outlet of the periscope to move the outlet relative to the grating set. The stepper motor may be connected with the outlet through a gear unit.

The laser light source set may include a first laser light source and a second laser light source. The first laser light source may be configured to emit a first colored light. The second laser light source may be configured to emit a second colored light. The second colored light may be initially emitted in a different direction from the first colored light such that the bandpass filter optionally receives the first colored light and the second colored light. The bandpass filter may mix the first and second colored light by reflecting one and transmitting the other.

In one embodiment, the first colored light and the second colored light are red and green respectively. In some embodiments, the red and green light is mixed to form orange light by the bandpass filter.

In one embodiment one or more heat sinks may be used to dissipate heat from the laser light source set.

In one embodiment, the grating set includes a grating track disposed on the edge of the grating set.

In one embodiment the radial direction of the ring-shaped grating set is parallel with a base plate. In another embodiment, the radial direction of the ring-shaped grating set is perpendicular to the base plate.

Figure 2A:
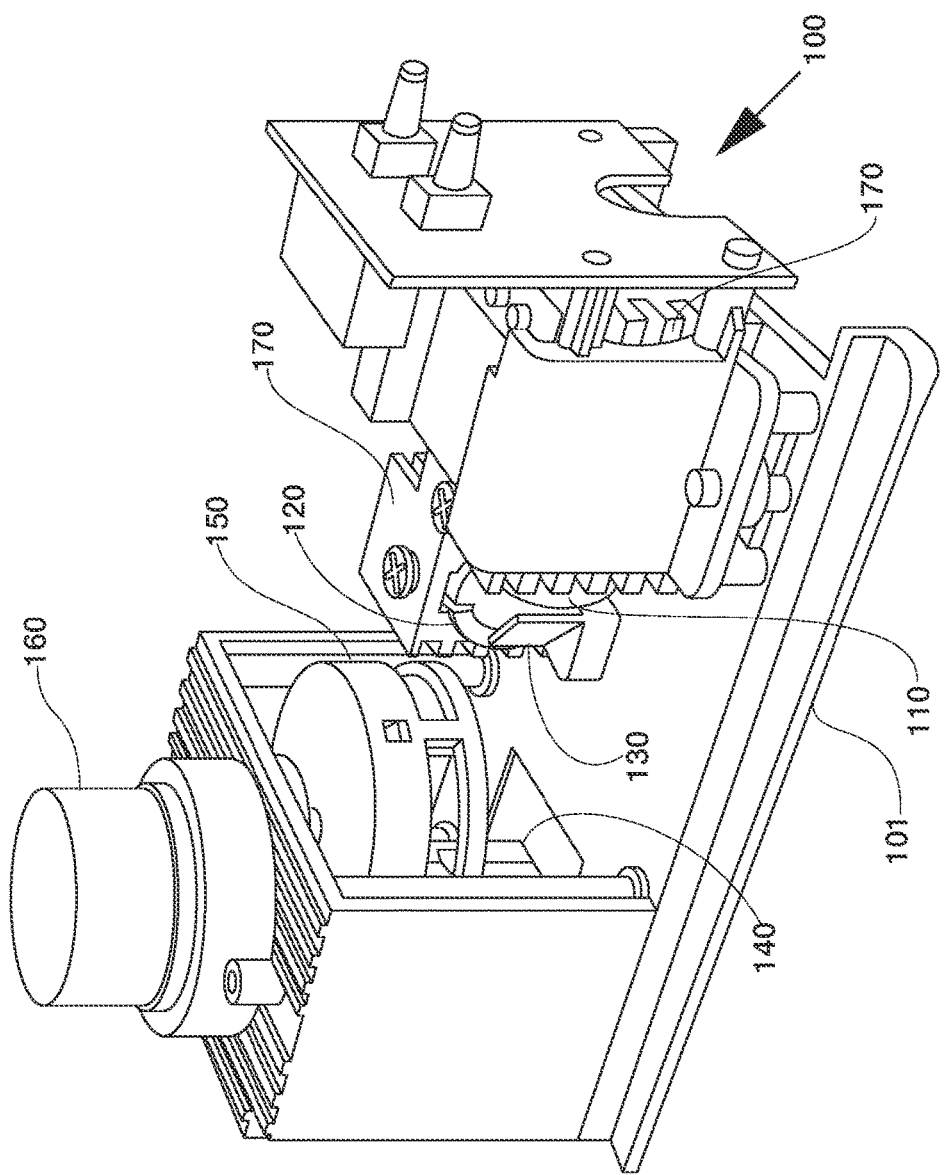
FIG. 2A illustrates a laser projection device according to a first embodiment of the present disclosure.

Moving to the figures, FIG. 2A illustrates a laser projection device 100 of a first embodiment of this disclosure. The laser projection device 100 may include a laser light source set comprised of a first laser light source 110 and a second laser light source 120. The first laser light source 110 may emit a first colored light and the second laser light source 120 may emit a second colored light. In one embodiment, the first colored light and the second colored light are different. In one embodiment, the first color is red and the second color is green.

The laser projection device 100 may also include a bandpass filter 130, a periscope 140, a grating set 150, and a motor 160. The first laser light source 110, the second laser light source 120, the bandpass filter 130, the periscope 140, the grating set 150, and the motor 160 may be mounted on a base plate 101. The base plate 101 is provided with a large area and configured to support the above components. The base plate 101 may facilitate mounting the above components as a module into a housing 201 (FIG. 6), for example by sliding the base plate 101 into the housing. In some embodiments, the base plate 101 may include a flange to make the mounting of the base plate into the housing easier.

In some embodiments, the laser projection device 100 may also include one or more heat sinks 170 disposed around the first laser light source 110 and the second laser light source 120. During projection, the first laser light source 110 and the second laser light source 120 will generate heat after long-term operation, and the resulting heat can be discharged by the heat sinks 170 disposed around the first laser light source 110 and the second laser light source 120 to prevent them from being damaging after long-term operation. The heat sinks 170 may include cooling fins or a cooling fan.

Figure 2B:
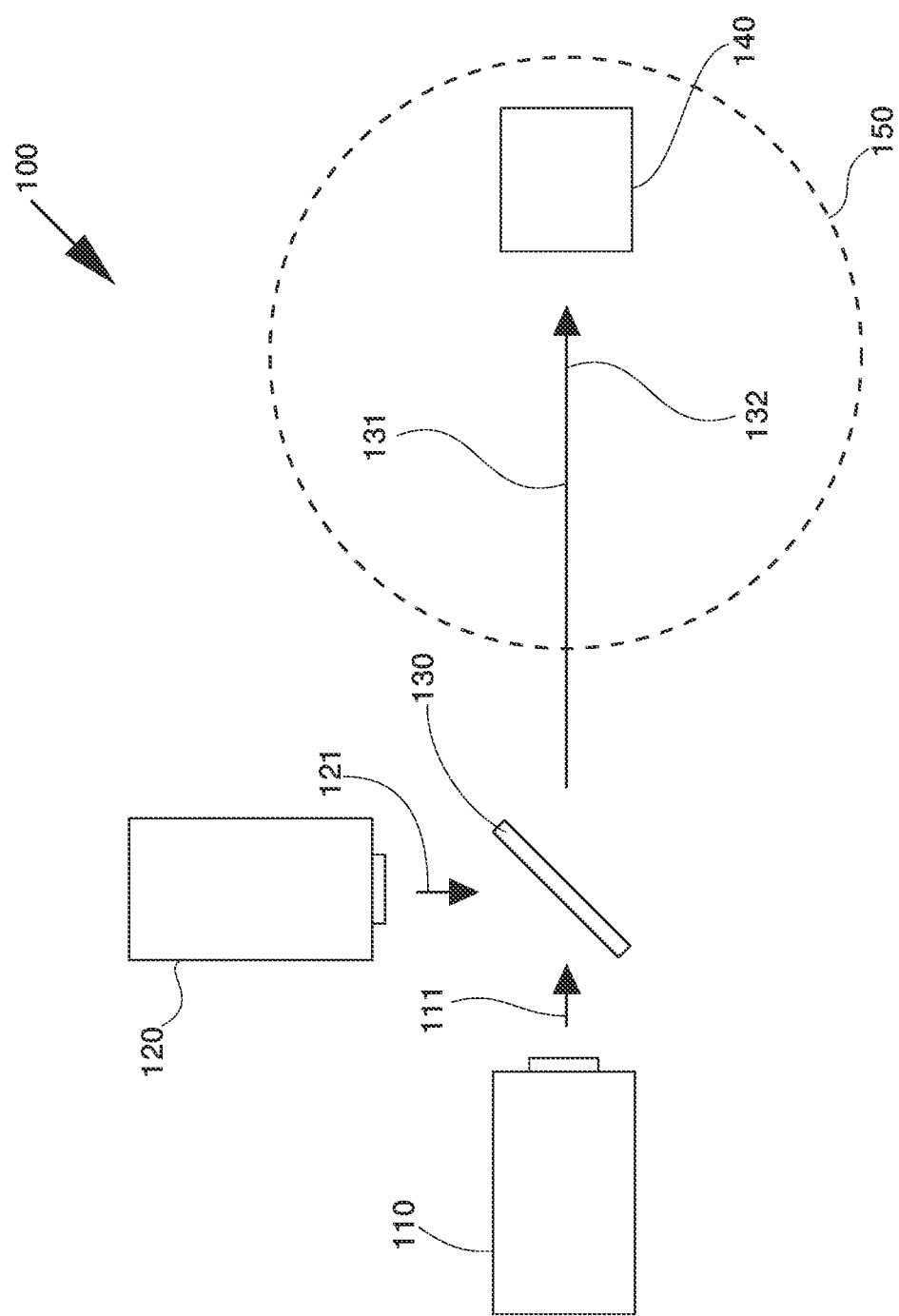
FIG. 2B schematically illustrates a top view of the laser projection device of FIG. 2A.

FIG. 2B presents a schematic top view where the first laser light source 110 and the second laser light source 120 of the laser light source set are laser light machines that are configured to emit laser light of different colors. The first laser light source 110 is configured to emit a first colored light 111. The second laser light source 120 is configured to emit a second colored light 121. The first laser light source 110 and the second laser light source 120 are shown facing different directions such that the first colored light 111 and the second colored light 121 also have different initial directions. In this embodiment, the first laser light source 110 is arranged perpendicular to the second laser light source 120. In addition, the first colored light 111 and the second colored light 121 may be red and green respectively.

In the illustrated embodiment, the bandpass filter 130 is disposed on the light source emission path of the first laser light source 110 and the second laser light source 120. The bandpass filter 130 is configured to receive the first colored light 111 and the second colored light 121 and mix them into a light beam 131. The light beam 131 travels along a first path segment 132 that may be emitted toward the periscope 140. In this embodiment, the light beam 131 is a combination of red and green. The bandpass filter 130 is positioned at a 45° angle between the position of the bandpass filter 130 with the paths of the first colored light 111 and the second colored light 121. In this embodiment, the light beam 131 is the result of mixing the first colored light 111 and the second colored light 121, resulting, for example, in orange light.

Figure 2C:
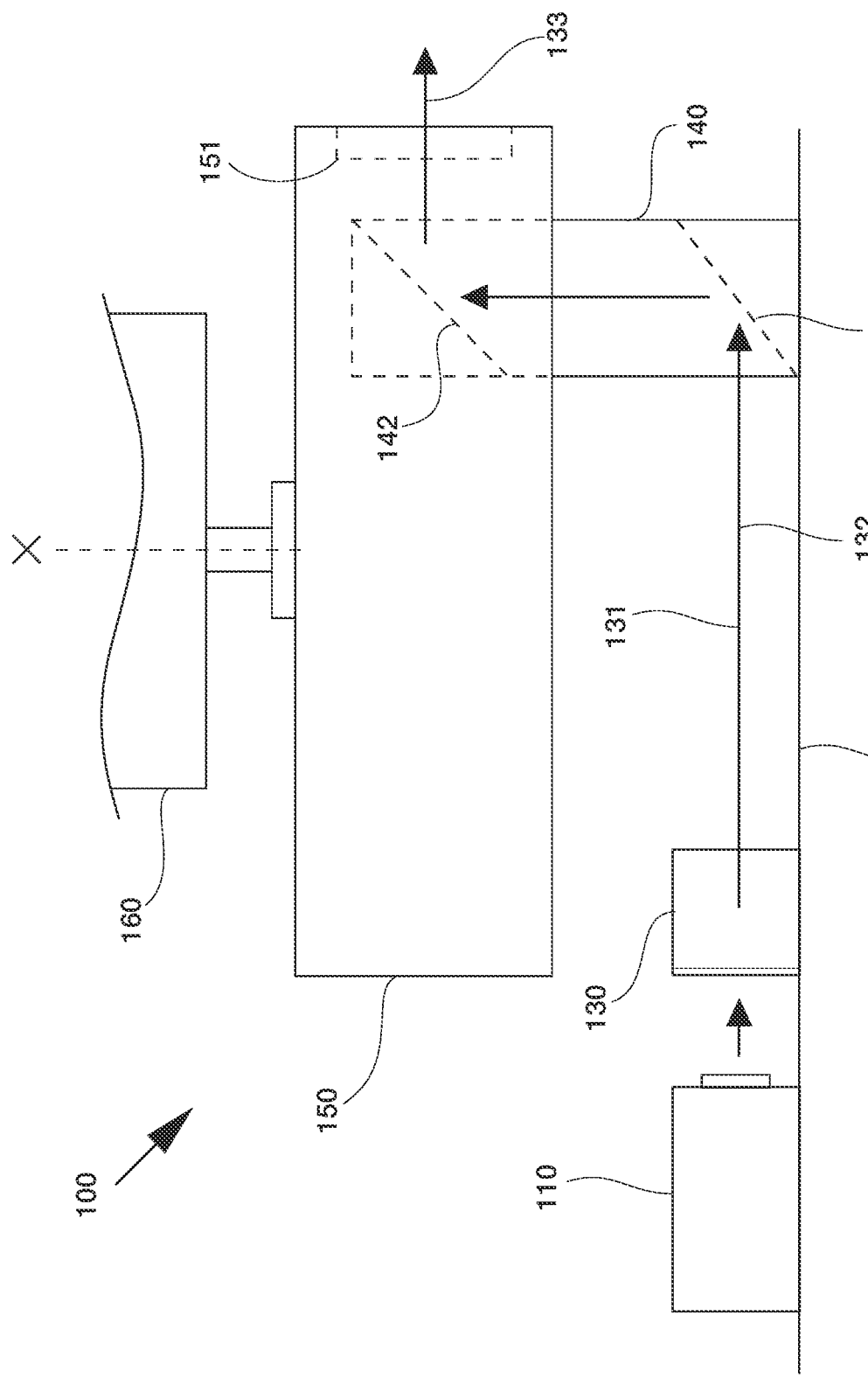
FIG. 2C schematically illustrates a side view of the laser projection device of FIG. 2A.

FIG. 2C presents a schematic side view of the laser projection device 100 to represent the function of the periscope 140. The periscope 140 is disposed on the first path segment 132 of the emission path of the light beam 131. One end of the periscope 140 receives the light 131 while the other end of the periscope 140 extends into the grating set 150. The grating set 150 is disposed above at least a portion of the periscope 140 and the grating set 150 is a ring structure that surrounds at least a portion of the periscope 140. The motor 160 is configured to rotate the grating set 150 about a rotational axis X. The periscope 140 leads the light 131 to the inner edge of the grating set 150 to make the light beam 131 pass a grating 151 of the grating set 150. In the illustrated embodiment, the radial direction of the grating set 150 is parallel to the base plate 101 and the rotational axis X is perpendicular to the base plate.

The periscope 140 may include a first reflector 141 and a second reflector 142. The first reflector 141 receives the light beam 131 from the first path segment 132 and then reflects the light beam upwards to the second reflector 142. The second reflector 142 receives the reflected light beam 131 and then reflects the beam along a second path segment 133 to the grating 151 of the grating set 150.

Figure 3A:
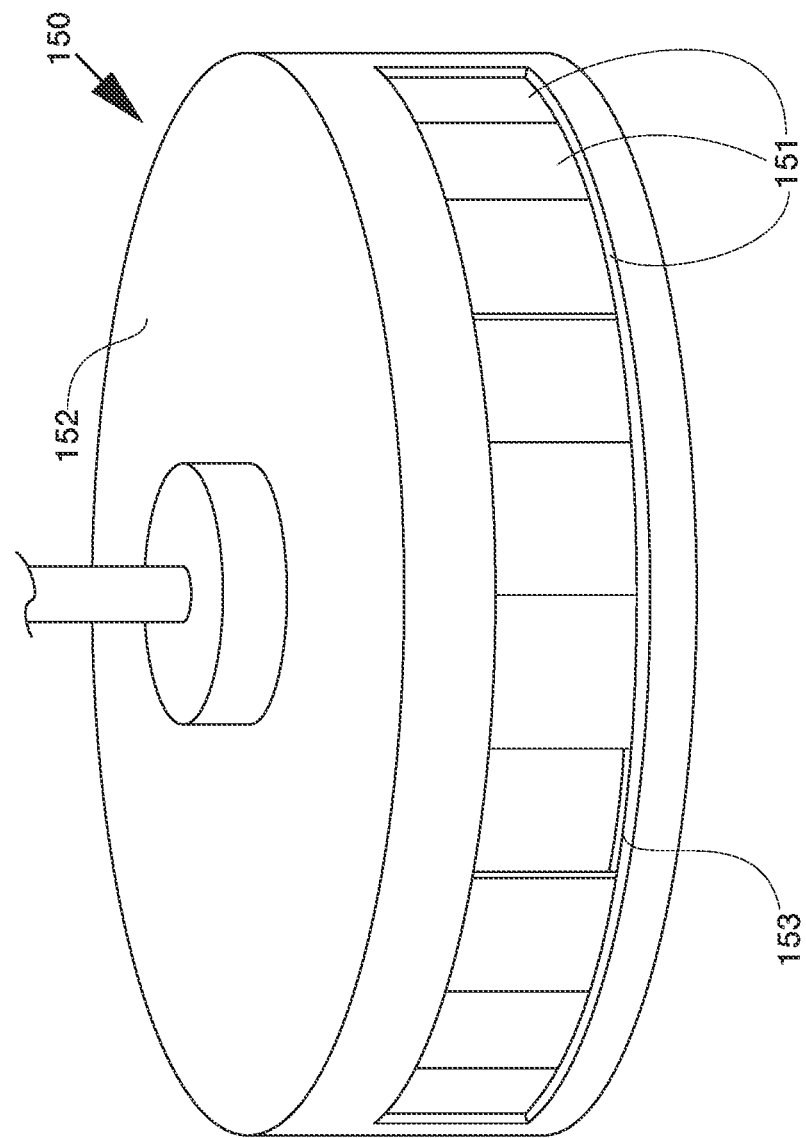
FIG. 3A illustrates a grating set according to one embodiment for use in the laser projection device of FIG. 2A.

With reference to FIG. 3A, the grating set 150 is further described. In this embodiment, the grating set 150 is a circular ring structure and has a seal-capping structure 152 to make the grating set 150 into one. The grating set 150 includes a plurality of gratings 151. The gratings 151 may be individual substrates or may be joined together. As used herein, the term "grating" is used broadly to mean an optical element that transmits light, which is received at a light receiving side, through a light emission side of the optical element, where the light is modified to project a pattern or image. The term "grating" is not necessarily limited to an optical structure comprised of spaced parallel lines. The "grating" may include, but are not limited to parallel line gratings, lenticular sheets, diffraction elements, holographic optical elements, gobos, stencils, and the like. The gratings 151 may be disposed on a grating track 153 that forms a circumference of the grating set 150. In one embodiment, the gratings 151 are replaceable. In other words, the gratings 151 can be dismounted from the grating set 150, so that the gratings 151 with different patterns can be available based on different demands.

Figure 3B:
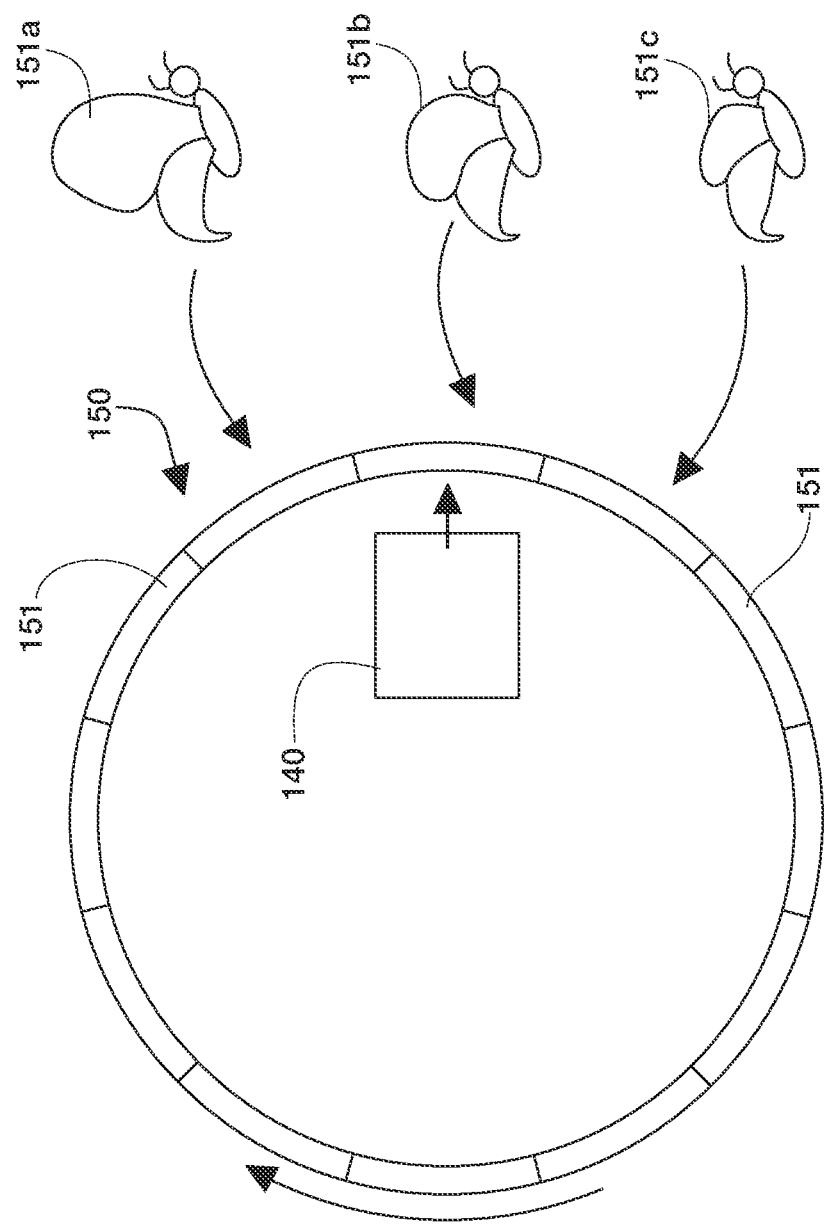
FIG. 3B schematically illustrates an example arrangement of gratings of the grating set of FIG. 3A.

With reference to FIG. 3B, the plurality of gratings 151 are disposed around the circumference of the grating set 150. Each grating 151 has a pattern. The pattern of each grating 151 is configured to be substantially continuous or sequential relative to the pattern on adjacent gratings. As an example, FIG. 3B shows butterfly patterns 151*a-c* for three adjacent gratings 151. The patterns 151*a-c* are each slightly different, for example, representing motion of the butterfly's wings. When the light beam 131 passes through the gratings 151, the light can project the pattern of the grating 151 to a display surface.

Returning to FIG. 2C, the laser projection device 100 also includes the motor 160. The motor 160 is linked to the grating set 150 and configured to turn the grating set 150. The turning of the grating set 150 can make the light 131 pass through each grating 151 sequentially. By arranging the gratings 151 such that the pattern of each grating 151 is continuous or sequential with the previous one, the images projected by the laser projection device 100 can be presented with an animated result. In the example of FIG. 3B, the grating set 150 turns clockwise and the light 131 emitted from the periscope 140 will pass the patterns 151*a*-151*c* in order. Therefore, the laser projection device 100 can project the animation images of a butterfly moving their wings.

Figure 1:
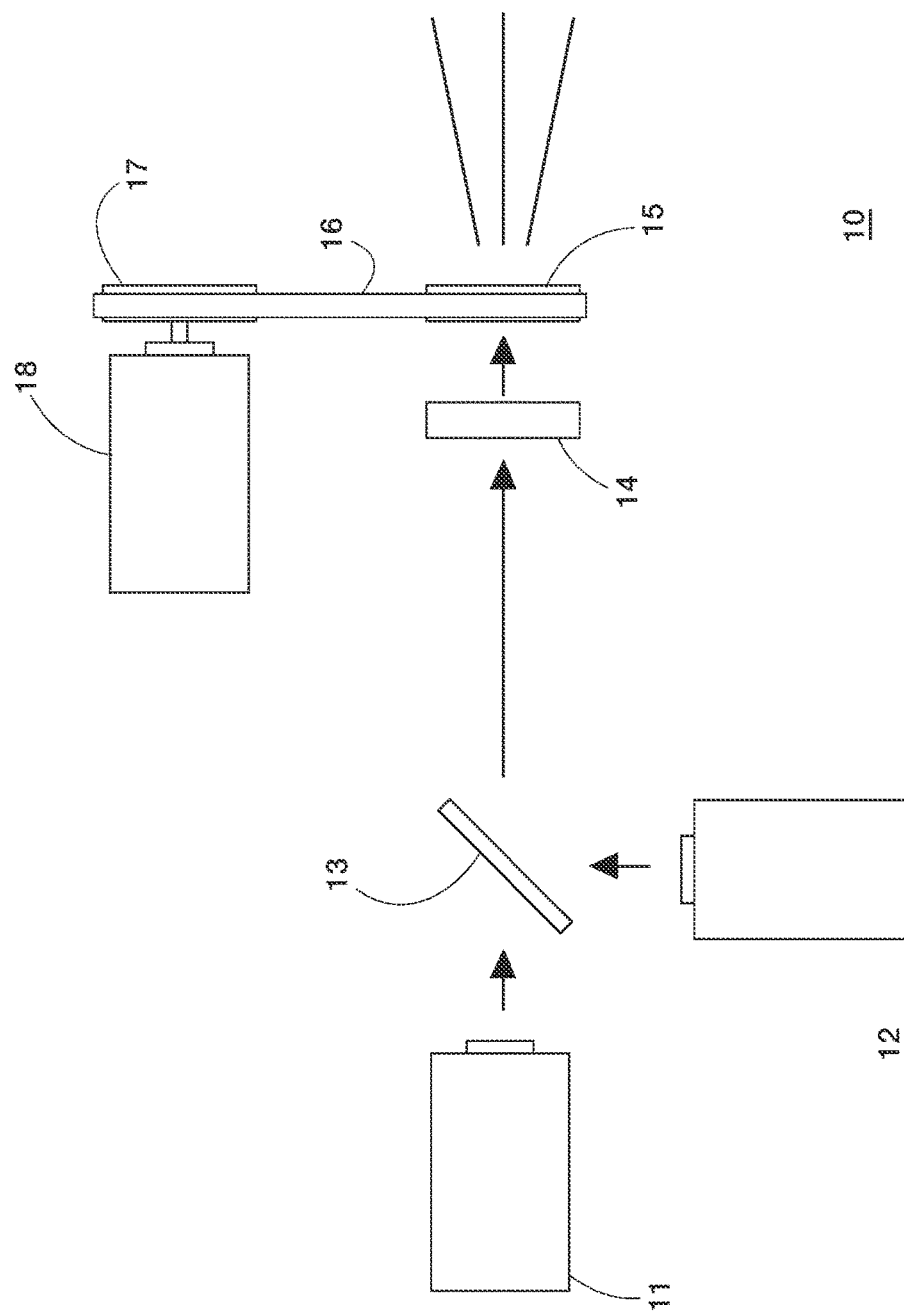
FIG. 1 schematically illustrates the operation of prior art laser projection devices.

In comparison with a traditional laser projection device 10 (FIG. 1), the laser projection device 100 is designed through the ring-shaped grating set 150, gratings 151, and motor 160 to achieve the projection of an animation effect through the continuous, sequential patterns on the gratings 151. Further, the laser projection device 100 can provide projection after passing through the grating 151 once instead of separate gratings 14 and 15 as found in the prior art. In the projection process, light splitting during the projection of the light 131 can be effectively reduced so that the color of the light 131 is maintained and a clear visual effect of the animated image is projected.

Figure 4A:
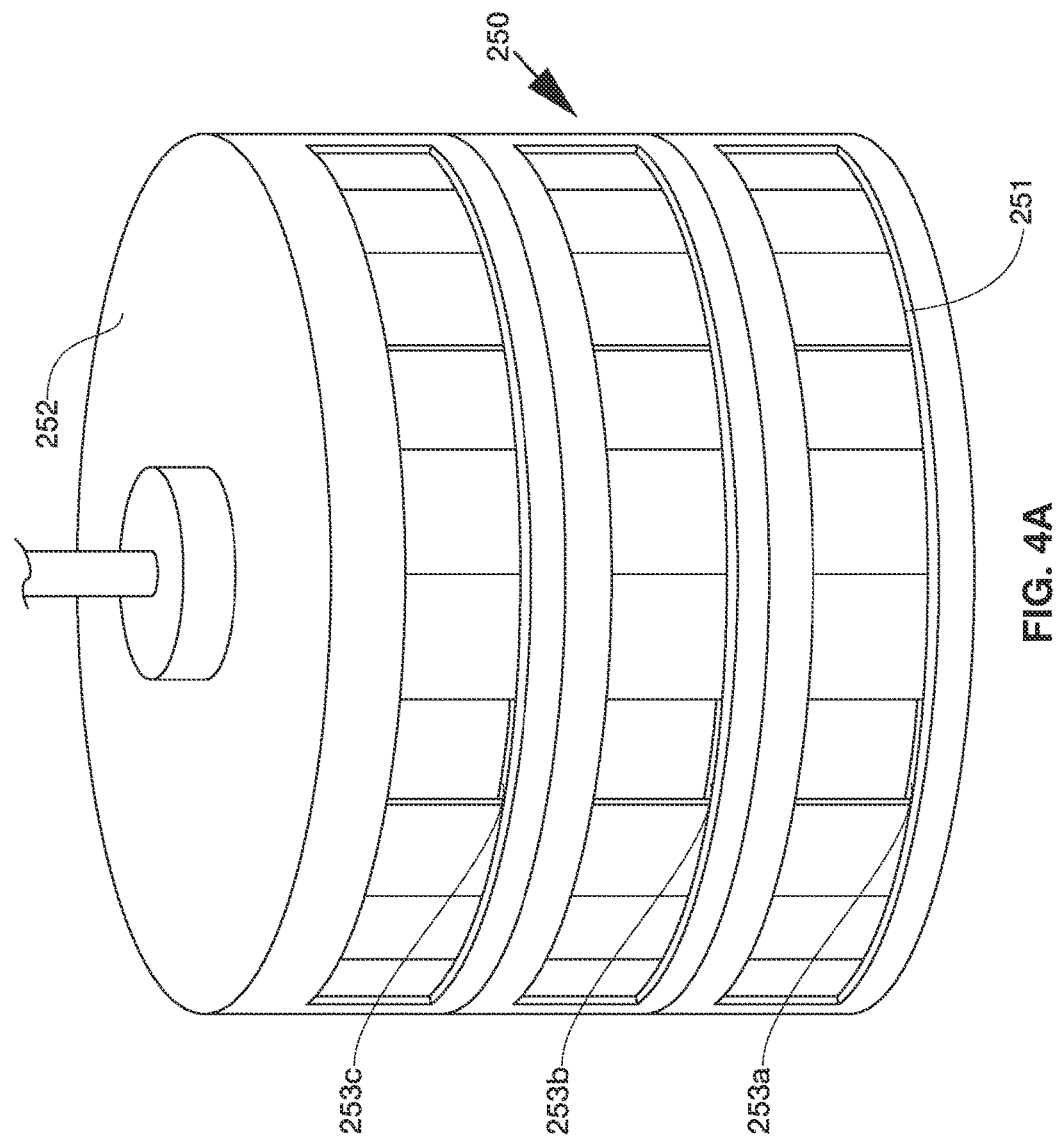
FIG. 4A illustrates a grating set according to a second embodiment for use in the laser projection device of FIG. 2A.
Figure 4B:
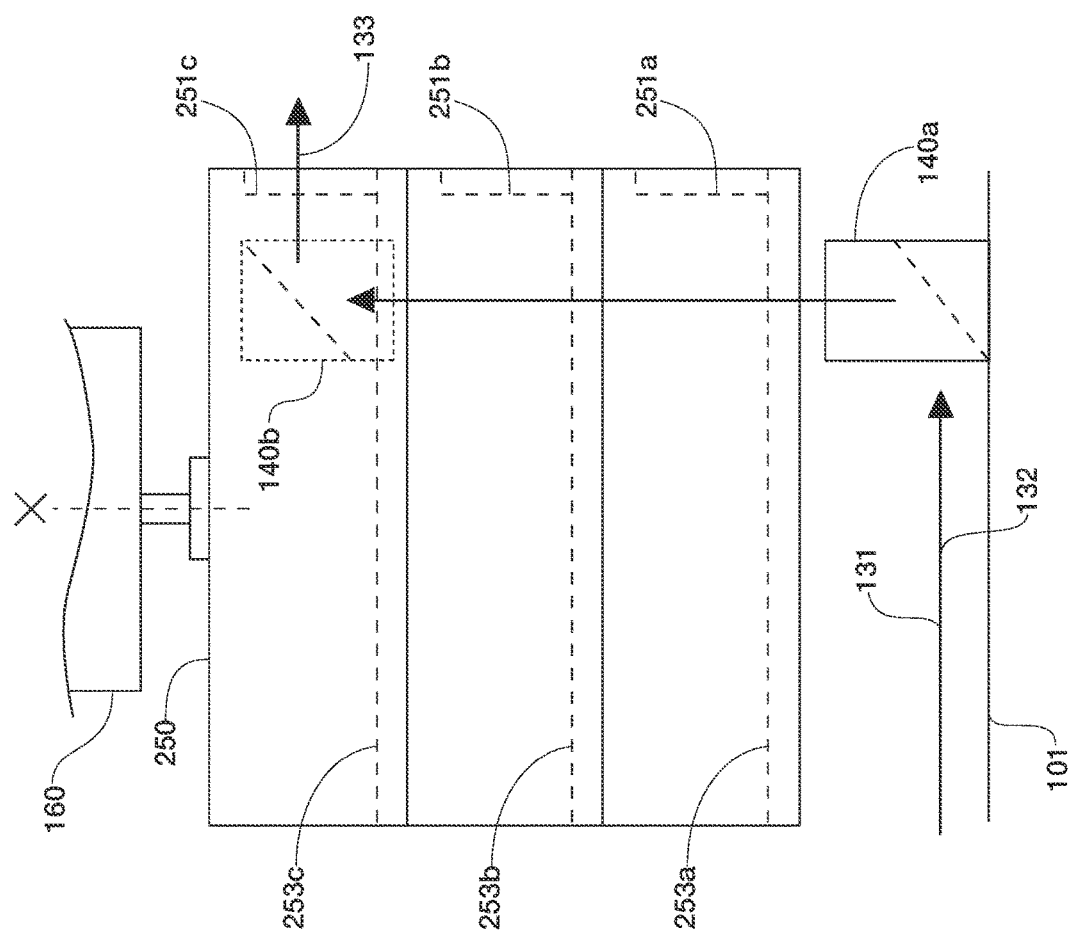
FIGS. 4B and 4C schematically partially illustrate the operation of the grating set of FIG. 4A as used in the laser projection device of FIG. 2A.
Figure 4C:
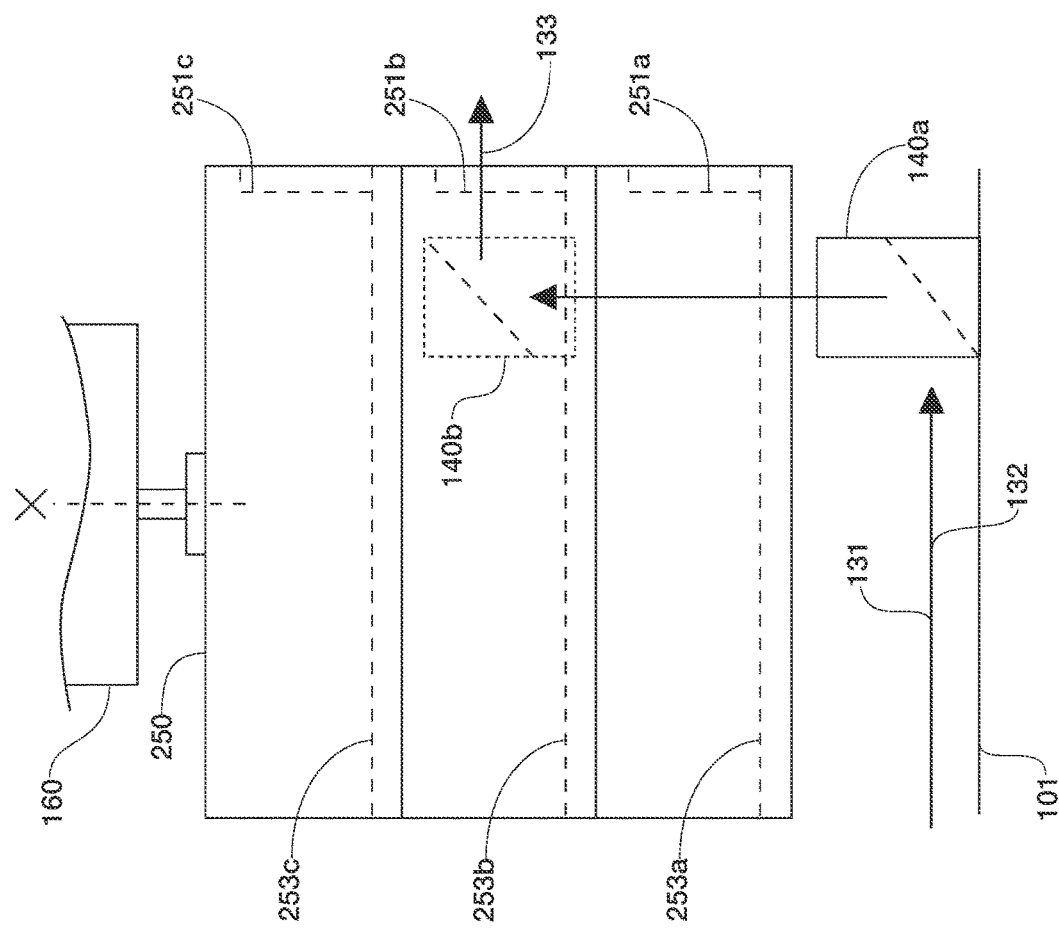

FIGS. 4A-4C illustrate a grating set 250 according to a second embodiment. In this embodiment, the grating set 250 includes a plurality of grating tracks 253*a*-253*c* and the grating tracks 253*a*-253*c* are disposed on the grating set 250 through a multi-layer design that results in a plurality of co-axial rows of gratings. In other words, the grating set 250 has a plurality of grating tracks 253*a*-253*c* to receive the gratings 251 to allow the laser projection device 100 to project longer or more complex animations because a greater number of frames (e.g. gratings 251) can be provided.

As possibly best shown in FIG. 4B, in this embodiment, the periscope includes an inlet 140*a* and an outlet 140*b*. The inlet 140*a* and the outlet 140*b* are separated from one another. The inlet 140*a* may be fixed relative to the base plate 101, while the outlet 140*b* is disposed above the inlet. The outlet 140*b* may be configured to move. The movement of the outlet 140*b* may be controlled through a stepper motor (not shown). In one embodiment, the stepper motor is linked to the outlet 140*b* through one or more gears (not shown). FIG. 4B shows the position of the outlet 140*b* adjacent to the grating track 253*c* so that the light passes the grating 251*c*. In FIG. 4C, the outlet 140*b* has been moved, for example by a stepper motor, to a position adjacent to the grating track 253*b* so that the light passes the grating 251*b*. Thus, through adjusting the position of the outlet 140*b*, the light passes through different gratings 251*a*-251*c* to enable the laser projection device 100 to project longer or more complex animation sequences.

Figure 5A:
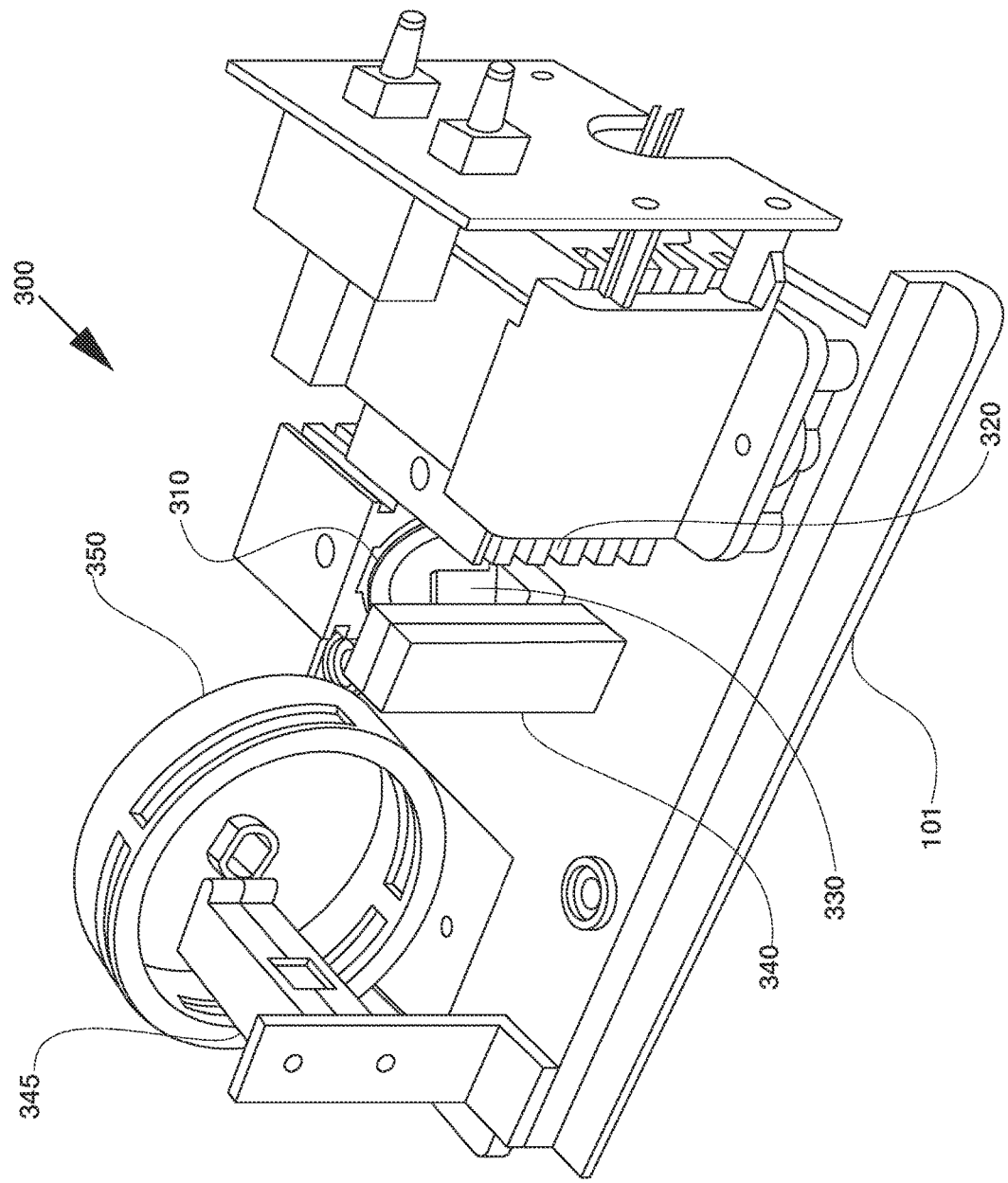
FIG. 5A illustrates a laser projection device according to a second embodiment of the present disclosure.

FIG. 5A illustrates a laser projection device 300 of another embodiment of the present disclosure. The laser projection device 300 in this embodiment includes a laser light source set, a first periscope 340, a second periscope 345, and a grating set 350 mounted relative to a base plate 101. The laser light source set includes a first laser light source 310, a second laser light source 320, and a bandpass filter 330. In this embodiment, the rotational axis of the grating set 350 is substantially parallel to the base plate 101, which is facilitated by the second periscope 345. The second periscope 345 is arranged along a different direction compared with the first periscope 340, and one end of the second periscope 345 extends into the interior of the grating set 350.

Figure 5B:
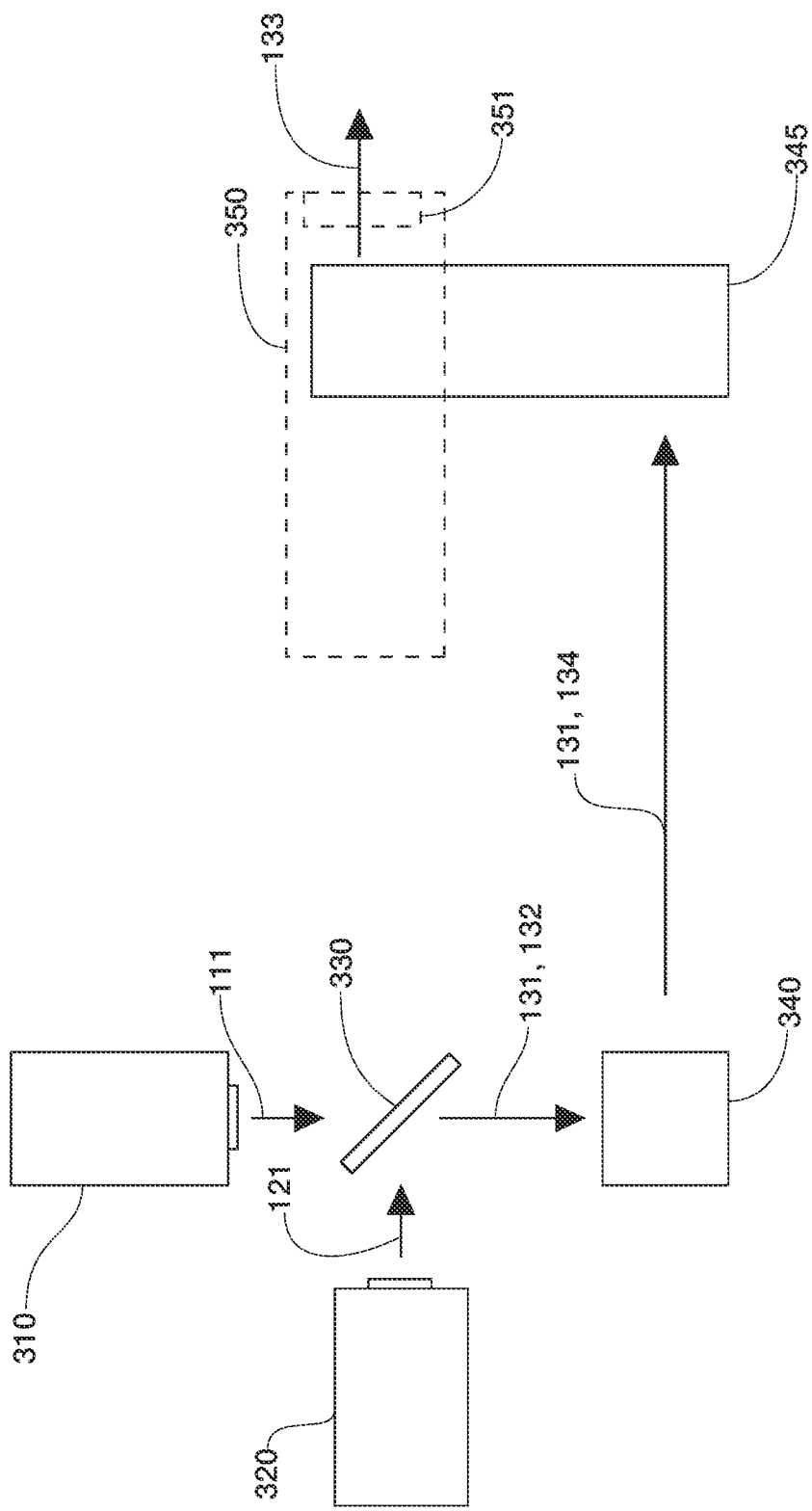
FIG. 5B schematically illustrates a top view of the laser projection device of FIG. 5A.

FIG. 5B presents a schematic top view of the laser projection device 300. The first laser light source 310 and the second laser light source 320 emit a first colored light 111 and a second colored light 121 to the bandpass filter 330. The first colored light 111 and the second colored light 121 can be mixed into a light beam 131 that enters into the first periscope 340 along the first path segment 132. The first periscope 340 will raise the light 131 and turn and reflect the light to the second periscope 345 along a third path segment 134. The second periscope 345 will project the light to the inner edge of the grating set 350 along the second path segment 133 such that the light passes through the gratings 351 and produces a projected pattern. Because the first periscope 340 raises the light, in a direction out of the page relative to FIG. 5B, one having ordinary skill in the art will understand that the first path segment 132, the second path segment 133, and the third path segment 134 are not co-planar because the second path segment 133 and the third path segment are on a horizontal plane above the first path segment 132.

Figure 6:
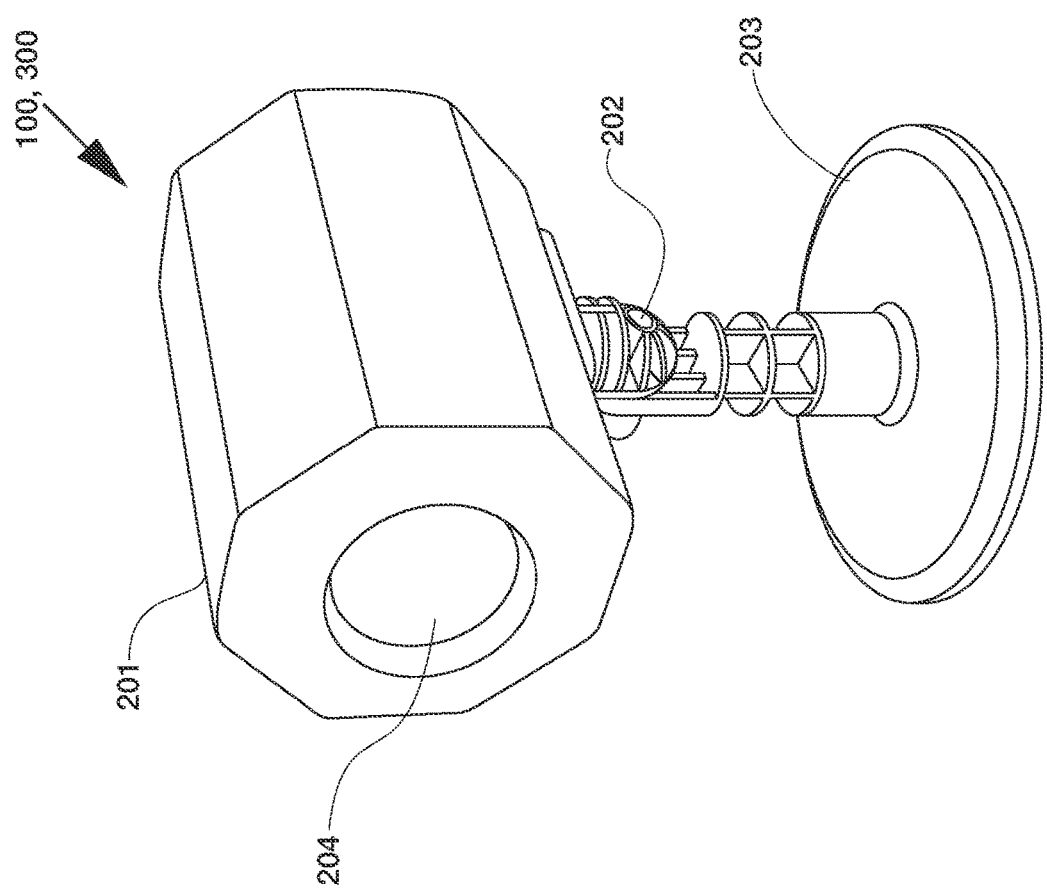
FIG. 6 illustrates an example housing for the laser projection device of FIG. 2A or FIG. 5A.

FIG. 6 illustrates a laser projection device 100, 300 where the components illustrated in FIG. 2A or FIG. 5A are disposed within a housing 201. The housing 201 is attached to a turning device 202 and a base 203. The turning device 202 is disposed below the housing 201 and is linked with the base 203. Therefore, the housing 201 can use the turning device 202 to pivot relative to the base 203 and adjust the projection angle of the laser projection device 100, 300 while the base 203 is configured to support the laser projection device 100, 300 and the housing 201. The housing 201 includes an opening with a lens 204 that permits the light of the laser projection device 100, 300 to escape the housing 201 and project an animation sequence to a display surface as discussed above. One having ordinary skill in the art will understand that the housing 201 in the illustrated embodiment of FIG. 6 is a non-limiting example and different shapes for the housing may be used based on mounting demands or aesthetic requirements. Further, the base 203 may be replaced by other support structures, such as a ground stake.

Figure 7A:
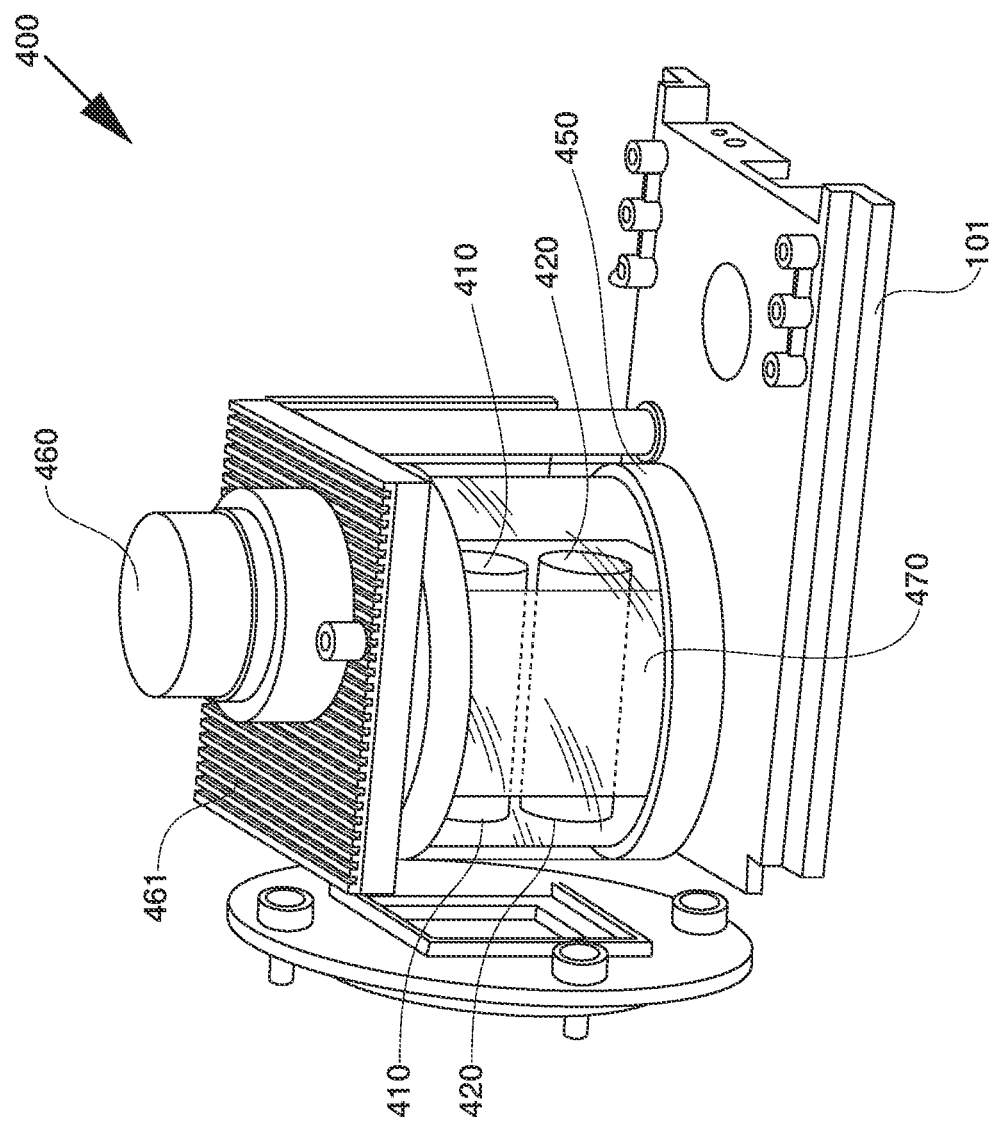
FIG. 7A partially illustrates a laser projection device according to a third embodiment of the present disclosure.

FIGS. 7A-D illustrate a laser projection device 400 according to a further embodiment. As shown in FIG. 7A, the laser projection device 400 includes a first laser light source 410, a second laser light source 420, a grating set 450, a motor 460, a heat sink 470, and a base plate 101. The laser projection device 400 of the illustrated embodiment may be characterized by the positioning the light source set within the interior of the ring-shaped grating set 450.

Figure 7B:
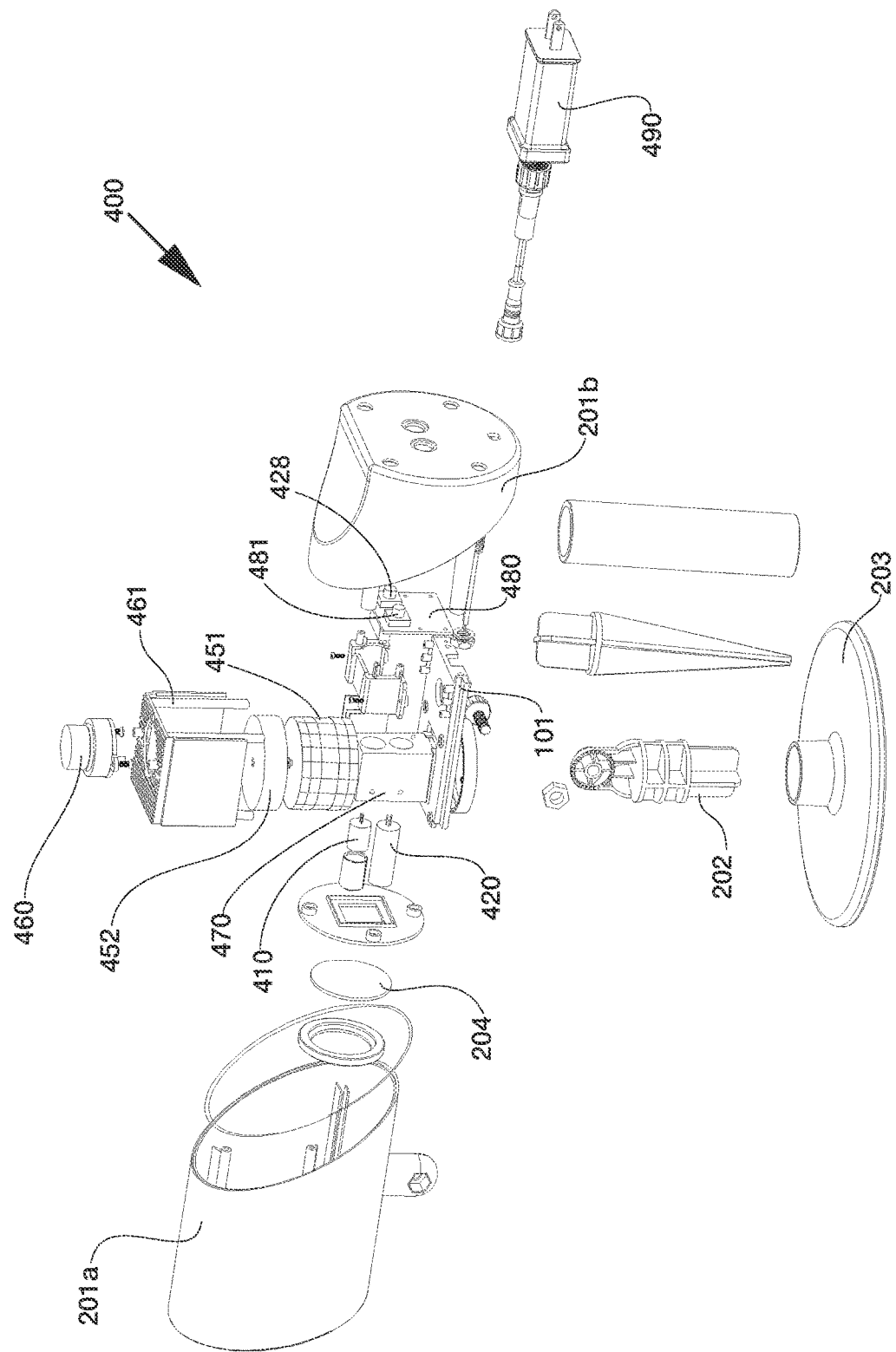
FIG. 7B illustrates an exploded view of the laser projection device of FIG. 7A including a housing therefore.

FIG. 7B shows an exploded view of a laser projection device 400 in combination with a housing. FIG. 7B includes a first laser light source 410 and a second laser light source 420, which may emit different colored light. The first and second laser light sources 410, 420 may be arranged to emit beams of light that are substantially parallel with one another, but not collinear, so that color mixing may be substantially avoided. The laser light sources 410, 420 are disposed in a heat sink 470 to dissipate heat generated by the lasers during projection. The grating set 450 includes a plurality of gratings 451 arranged in a ring within one or more co-axial rows. The gratings 451 are retained by a grating track within a capping structure 452. The light beams from the first and second laser light sources 410, 420 may be emitted directly to a light receiving side of a grating 451 without use of a bandpass filter. The first laser light source 410 may emit light incident upon a first row of gratings 451a (FIG. 7D) and the second laser light source 420 may emit light incident upon a second row of gratings 451b. The pattern sequence of the first row of gratings may be a different pattern sequence from the second row of gratings. A motor 460 can rest on a support 461. The motor 460 is operably connected to the capping structure 452 of the grating set 450 such that the motor 460 rotates the plurality of gratings 451 past the laser light sources 410, 420.

FIG. 7B shows additional elements of the laser projection device 400 including a controller 480 and a power source 490. The controller 480 may include a first switch 481 to select between powering the first laser light source 410, powering the second laser light source 420, or powering both laser light sources simultaneously. A second switch 482 may select between an animation mode where the motor 460 is powered to rotate the grating set 450, and a static mode where the motor is stationary. The power source 490 may be a plug for receiving current from a wall socket, and may include an adaptor to convert alternating current to direct current. In other embodiments (not shown), the power source may be a battery.

FIG. 7B also shows the housing including a front housing 201a and a rear housing 201b. The laser projection device 400 may also include the turning device 202, the base 203 and the lens 204.

FIG. 7C schematically illustrates a top view of the operation of the laser projection device 400 of the current embodiment. Particularly, the first laser light source 410 is illustrated emitting a first colored light 411 through one of a plurality of gratings 451 of the grating set 450. The first laser light source 410 is shown disposed within the ring-shape of the grating set 450 to emit light toward the light receiving side 454 of each grating 451. The light 411 then passes from the light emitting side 455 of the grating 451 to project the pattern of the grating to a display surface.

Figure 7D:
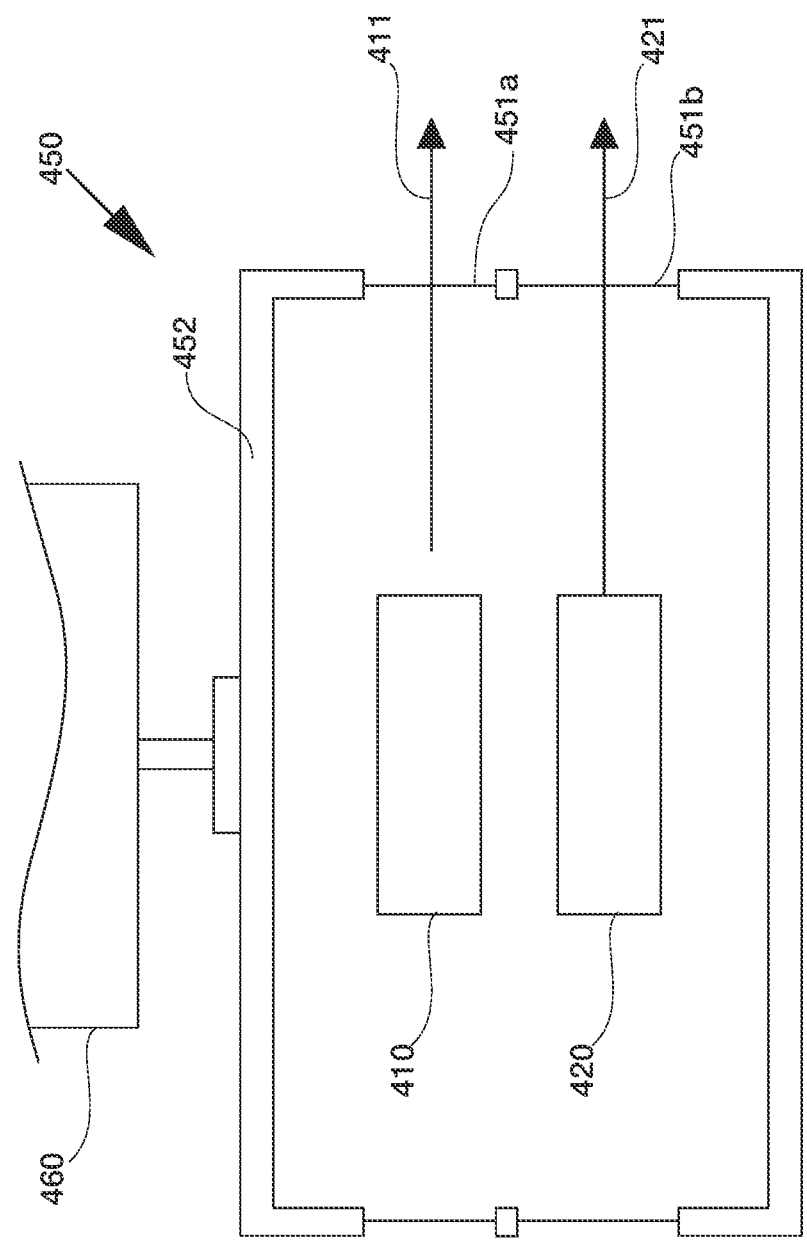
FIG. 7D schematically illustrates a side view of the laser projection device of FIG. 7A.

FIG. 7D schematically illustrates a side view of the operation of the laser projection device 400 of the current embodiment. The first laser light source 410 is shown emitting a first colored light 411 through a first grating 451a in a first row of gratings of the grating set 450, and the second laser light source 420 is shown emitting a second colored light 421 through a second grating 451b in a second row of gratings of the grating set 450. The first colored light 411 and the second colored light 421 are shown as beams that are generally emitted in parallel such that mixing of the colors may be avoided in the present embodiment.

Although the above disclosure has been presented in the context of example embodiments, it is to be understood that modifications and variations may be utilized without departing from the spirit and scope of the disclosure, as those skilled in the art will readily understand. Such modifications and variations are considered to be within the purview and scope of the appended claims and their equivalents.

The invention claimed is:

1. A laser projection device, comprising:
   at least one laser light source, which is configured to emit light;
   a plurality of gratings, each grating having a light receiving side and a light emitting side, wherein the plurality of gratings are arranged in a ring-shape having at least one row with the light receiving side of each grating facing a center of the ring-shape;
   a motor configured to rotate the plurality of gratings about a rotational axis passing through the center of the ring-shape; and
   at least one periscope, wherein the at least one periscope receives light from the at least one laser light source along a first path segment and emits light to the light receiving side of the plurality of gratings along a second path segment, wherein the first path segment is not collinear with the second path segment,
   wherein the plurality of gratings each comprise a pattern for forming an image,
   wherein the plurality of gratings are arranged such that the plurality of patterns are configured to project an animated image when the plurality of gratings sequentially receive light from the at least one laser light source upon rotation of the grating set.

2. The laser projection device of claim 1, wherein the at least one laser light source comprises:
   a first laser light source, which is configured to emit a first colored light; and
   a second laser light source, which is configured to emit a second colored light,
   wherein the second colored light is different from the first colored light.

3. The laser projection device of claim 2, wherein the first colored light is red and the second colored light is green.

4. The laser projection device of claim 2, wherein the first laser light source emits the first colored light in a different direction than the second laser light source emits the second colored light.

5. The laser projection device of claim 4, further comprising a bandpass filter,
   wherein the bandpass filter receives and mixes the first colored light with the second colored light.

6. The laser projection device of claim 1, further comprising:
   a stepper motor,
   wherein the periscope includes an inlet and an outlet, and
   wherein the stepper motor is operably connected to the outlet such that the stepper motor is configured to move the outlet.

7. The laser projection device of claim 6, wherein the stepper motor is operably connected to the outlet with gears.

8. The laser projection device of claim 7, wherein the plurality of gratings are arranged in the ring-shape in at least two co-axial rows,
   wherein moving the outlet comprises aligning the outlet with another row of the at least two co-axial rows.

9. The laser projection device of claim 1, wherein the at least one periscope comprises:
   a first periscope that receives light from the at least one laser light source along the first path segment and emits light along a third path segment, and
   a second periscope that receives light traveling along the third path segment and emits light to the light receiving side of the plurality of gratings along the second path segment.

10. The laser projection device of claim 9, wherein the first path segment, the second path segment, and the third path segment are not co-planar.

11. The laser projection device of claim 1, wherein the at least one laser light source is disposed within the ring.

12. The laser projection device of claim 1, further comprising a base plate for mounting the at least one laser light source,
   wherein the rotational axis of the ring-shape is parallel with the base plate.

13. The laser projection device of claim 1, further comprising a base plate for mounting the at least one laser light source,
   wherein the rotational axis of the ring-shape is perpendicular with the base plate.

14. The laser projection device of claim 1, wherein the plurality of gratings are removably positioned in a grating track.

15. The laser projection device of claim 1, further comprising at least one heat sink.

* * * * *